(12) United States Patent
Nishida et al.

(10) Patent No.: US 9,560,234 B2
(45) Date of Patent: Jan. 31, 2017

(54) IMAGE READING DEVICE AND IMAGE FORMING APPARATUS

(71) Applicant: FUJI XEROX CO., LTD., Tokyo (JP)

(72) Inventors: Yoji Nishida, Yokohama (JP); Shusaku Yokota, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/803,634

(22) Filed: Jul. 20, 2015

(65) Prior Publication Data
US 2016/0295061 A1 Oct. 6, 2016

(30) Foreign Application Priority Data
Mar. 30, 2015 (JP) .................. 2015-068941

(51) Int. Cl.
H04N 1/04 (2006.01)
H04N 1/028 (2006.01)
H04N 1/387 (2006.01)
H04N 1/00 (2006.01)

(52) U.S. Cl.
CPC ...... *H04N 1/02885* (2013.01); *H04N 1/00798* (2013.01); *H04N 1/3876* (2013.01); *H04N 2201/0081* (2013.01); *H04N 2201/0094* (2013.01); *H04N 2201/0422* (2013.01)

(58) Field of Classification Search
CPC ............ H04N 1/02885; H04N 1/00798; H04N 1/3876; H04N 2201/0081
USPC ....... 358/475, 497, 450, 449, 488, 486, 483, 358/482, 509, 514; 250/208.1, 239, 250/234–236; 399/211, 212, 220, 221
See application file for complete search history.

(56) References Cited

U.S. PATENT DOCUMENTS

| | | | | |
|---|---|---|---|---|
| 6,147,780 A * | 11/2000 | Chiang | ................ | H04N 1/0408 358/483 |
| 6,166,831 A * | 12/2000 | Boyd | ................... | H04N 3/1581 348/275 |
| 6,498,867 B1 * | 12/2002 | Potucek | ............ | H04N 1/00092 356/237.2 |
| 7,158,099 B1 * | 1/2007 | Berube | ................. | G03B 15/03 345/9 |
| 7,619,664 B2 * | 11/2009 | Pollard | ............. | H04N 1/00835 348/241 |
| 7,630,002 B2 * | 12/2009 | Jenkins | ................. | G06F 3/0425 345/173 |
| 2001/0002850 A1 * | 6/2001 | Slatter | ............... | H04N 1/02815 348/370 |
| 2003/0118249 A1 * | 6/2003 | Edgar | ................... | G06T 7/0002 382/275 |

(Continued)

FOREIGN PATENT DOCUMENTS

JP 2013-168925 A 8/2013

*Primary Examiner* — Cheukfan Lee
(74) *Attorney, Agent, or Firm* — Oliff PLC

(57) ABSTRACT

An image reading device includes a support table that supports a document; a light source that is supported movably along the support table between a reading start position set near one end of the support table and a reading end position set near the other end of the support table and that irradiates the document with light; a reading member that reads an image based on reflected light from the document; and an image composing unit that composes read image information based on a first image read by the reading member and a second image based on light reflected from the document in a direction different from a direction of the first image.

6 Claims, 9 Drawing Sheets

(56) References Cited

U.S. PATENT DOCUMENTS

| | | | |
|---|---|---|---|
| 2008/0265033 A1* | 10/2008 | Shintani | H04N 1/1934 235/454 |
| 2009/0002774 A1* | 1/2009 | King | G06T 5/50 358/474 |
| 2009/0073518 A1* | 3/2009 | Wang | H04N 1/00681 358/505 |
| 2009/0153697 A1* | 6/2009 | King | H04N 1/401 348/229.1 |
| 2011/0013001 A1* | 1/2011 | Craven-Bartle | G06F 3/03545 348/61 |
| 2011/0142371 A1* | 6/2011 | King | G06Q 30/00 382/313 |
| 2012/0013771 A1* | 1/2012 | Sugimori | H04N 5/23232 348/239 |
| 2012/0026353 A1* | 2/2012 | Majewicz | G03B 15/05 348/222.1 |
| 2012/0268626 A1* | 10/2012 | Lu | H04N 5/2625 348/241 |
| 2013/0181311 A1 | 7/2013 | Sugiyama | |
| 2014/0347705 A1* | 11/2014 | Umemoto | H04N 1/00092 358/474 |
| 2015/0063720 A1* | 3/2015 | Maltz | G06T 5/007 382/284 |
| 2015/0070737 A1* | 3/2015 | Hirata | H04N 1/6044 358/504 |

* cited by examiner

IMAGE READING DEVICE AND IMAGE FORMING APPARATUS

CROSS-REFERENCE TO RELATED APPLICATIONS

This application is based on and claims priority under 35 USC 119 from Japanese Patent Application No. 2015-068941 filed Mar. 30, 2015.

BACKGROUND

The present invention relates to an image reading device and an image forming apparatus.

SUMMARY

According to an aspect of the invention, there is provided an image reading device including a support table that supports a document; a light source that is supported movably along the support table between a reading start position set near one end of the support table and a reading end position set near the other end of the support table and that irradiates the document with light; a reading member that reads an image based on reflected light from the document; and an image composing unit that composes read image information based on a first image read by the reading member and a second image based on light reflected from the document in a direction different from a direction of the first image.

BRIEF DESCRIPTION OF THE DRAWINGS

Exemplary embodiments of the present invention will be described in detail based on the following figures, wherein:

FIGS. 6A to 6C are explanatory views each indicating a relationship between a document with protrusions and indentations and irradiation light from lamps according to the first exemplary embodiment, FIG. 6A being an explanatory view of a state in which only a first lamp is turned on, FIG. 6B being an explanatory view of a state in which only a second lamp is turned on, FIG. 6C being an explanatory view of a state in which both the two lamps are turned on;

DETAILED DESCRIPTION

Specific examples of exemplary embodiments of the present invention (hereinafter, referred to as an exemplary embodiments) are described below with reference to the figures. However, the present invention is not limited to the following exemplary embodiments.

For easier understanding of the following description, in the figures, it is assumed that the front-rear direction represents the X-axis direction, the left-right direction represents the Y-axis direction, and the up-down direction represents the Z-axis direction, and directions or sides indicated by arrows X, −X, Y, −Y, Z, and −Z respectively represent the forward, rearward, rightward, leftward, upward, and downward directions, or represent the front, rear, right, left, upper, and lower sides.

Also, in the figures, a symbol in which a dot "•" is illustrated in a circle "○" represents an arrow directed from the back side to the front side of the paper, and a symbol in which a cross "x" is illustrated in a circle "○" represents an arrow directed from the front side to the back side of the paper.

In the following description with reference to the figures, illustration of members other than members required for description for easier understanding is occasionally omitted.

First Exemplary Embodiment

Figure 1:
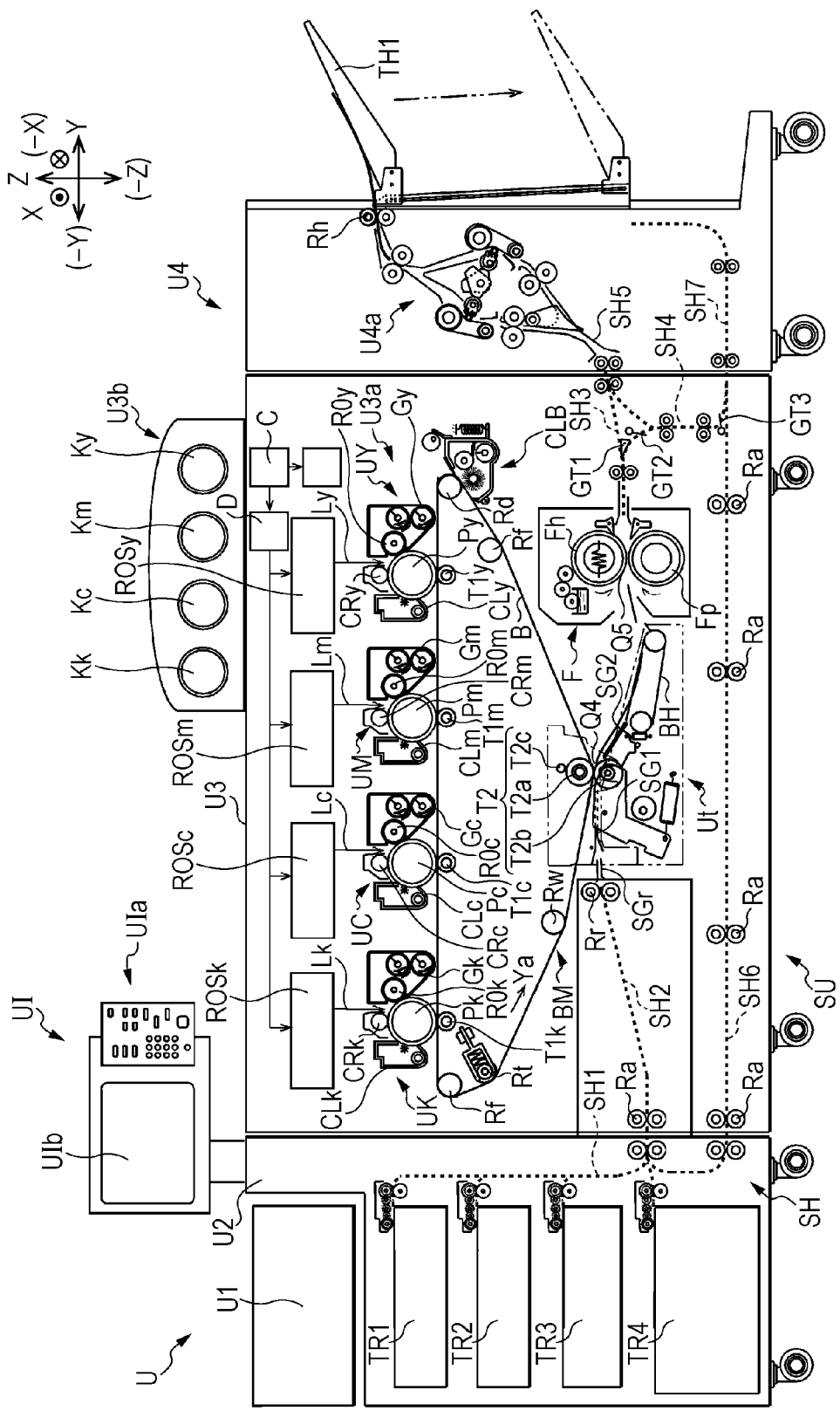
FIG. 1 is an entire explanatory view of an image forming apparatus according to a first exemplary embodiment.

FIG. 1 is an entire explanatory view of an image forming apparatus according to a first exemplary embodiment.

Figure 2:
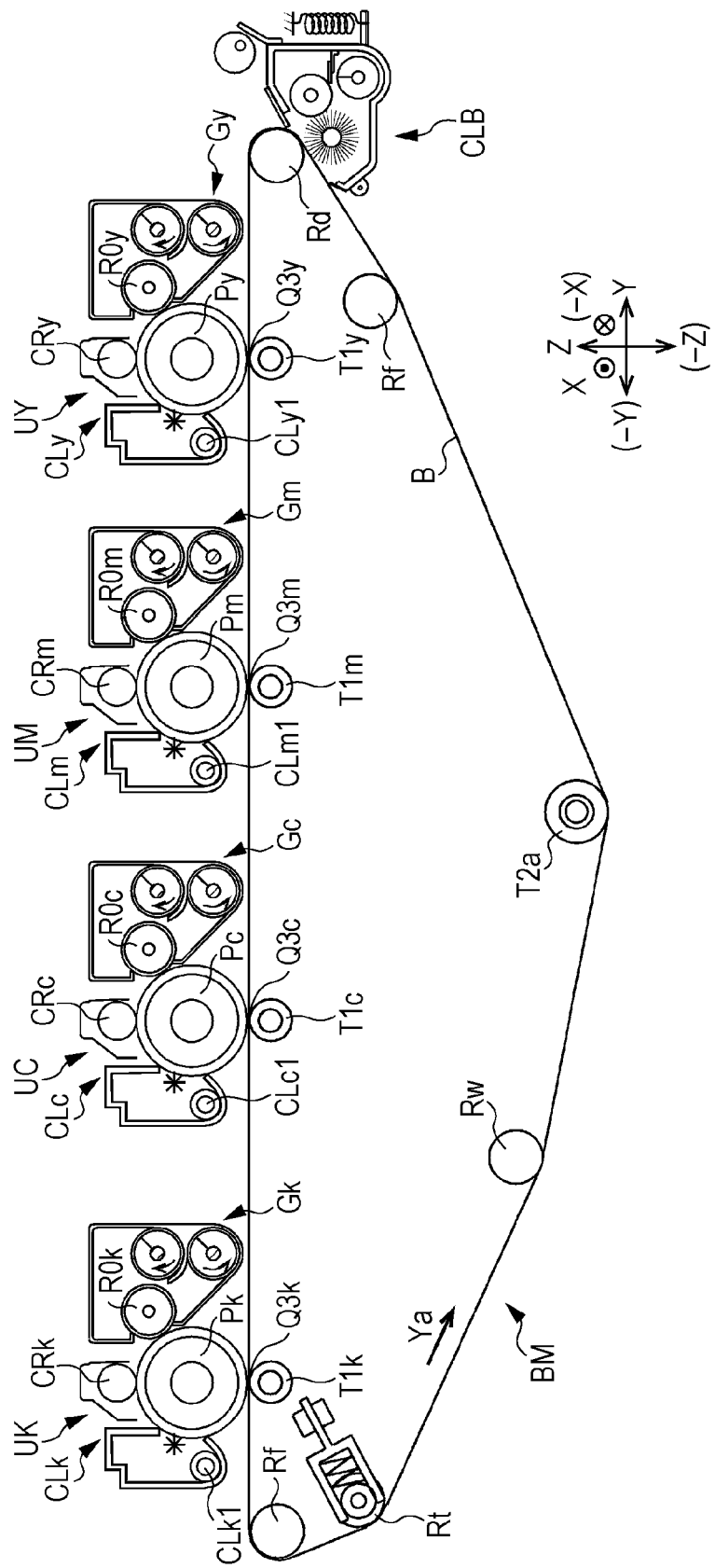
FIG. 2 is an enlarged explanatory view of a visible image forming device according to the first exemplary embodiment.

FIG. 2 is an enlarged explanatory view of a visible image forming device according to the first exemplary embodiment.

In FIG. 1, a copier U as an example of an image forming apparatus includes an operation unit UI, a scanner unit U1 as an example of an image reading device, a feeder unit U2 as an example of a medium feed device, an image creating unit U3 as an example of an image recording device, and a medium processing device U4.

Description of Operation Unit UI

The operation unit UI has an input button UIa that is used to start copying and set the number of copies. Also, the operation unit UI has a display UIb on which the content input by the input button UIa and the state of the copier U are displayed.

Description of Scanner Unit U1

Figure 3:
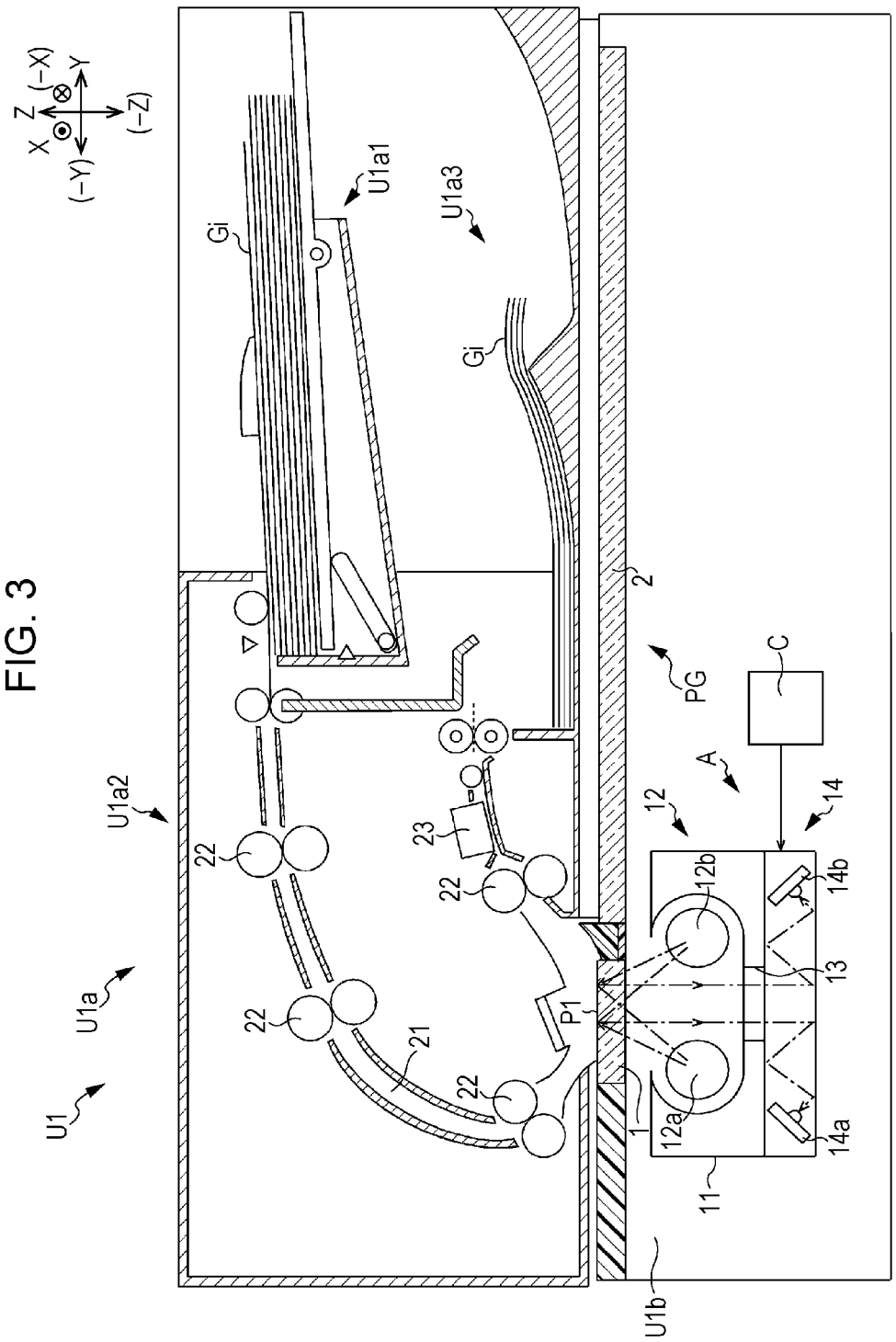
FIG. 3 is an entire explanatory view of an image reading device according to the first exemplary embodiment.

FIG. 3 is an entire explanatory view of an image reading device according to the first exemplary embodiment.

In FIGS. 1 and 3, the scanner unit U1 includes a scanner body portion U1b having a transparent document table PG at an upper end thereof, as an example of a body portion of the image reading device. A document transport device U1a is supported on an upper surface of the scanner body portion U1b, so that the document table PG is openable and closable.

The document transport device U1a has a document feed tray U1a1 on which plural documents Gi to be copied are stacked and housed, as an example of a document mount portion. A document transport unit U1a2 is provided at the left of the document feed tray U1a1. The document transport unit U1a2 transports a document Gi on the document feed tray U1a1 onto the document table PG. A document output tray U1a3 is arranged below the document feed tray U1a1, as an example of a document output portion. On the document output tray U1a3, the document Gi which has passed through the document table PG is output from the document transport unit U1a2.

A reading unit A that reads an image of the document Gi is arranged in the scanner body portion U1b. The reading unit A is supported movably in the left-right direction along the document table PG. The reading unit A converts reflected light from the document Gi into electric signals of red R, green G, and blue B, and inputs the electric signals to an image processing unit.

The image processing unit converts the electric signals of RGB input from the reading unit A into image information of black K, yellow Y, magenta M, and cyan C, and temporarily stores the image information. The image processing unit outputs the image information to a driving circuit D of a latent image forming device of the image creating unit U3 at a predetermined timing as image information for formation of a latent image.

If a document image is a single-color image, i.e., a monochrome image, image formation of only black K is input to the driving circuit D of the latent image forming device.

The document table PG, the reading unit A, and the image processing unit configure the scanner body portion U1b according to the first exemplary embodiment.

Description of Feeder Unit U2

In FIG. 1, the feeder unit U2 includes plural paper feed trays TR1, TR2, TR3, and TR4 each serving as an example of a medium housing container. Also, the feeder unit U2 includes a medium feed path SH1 and the like that takes a recording sheet S as an example of an image recording medium housed in one of the paper feed trays TR1 to TR4 and transports the recording sheet S to the image creating unit U3.

Description of Image Creating Unit U3 and Medium Processing Device U4

In FIG. 1, the image creating unit U3 includes an image recording unit U3a that records an image based on the document image read by the scanner unit U1 on the recording sheet S transported from the feeder unit U2.

In FIGS. 1 and 2, the driving circuit D of the latent image forming device of the image creating unit U3 outputs a corresponding driving signal based on the image information input from the scanner unit U1 at a predetermined timing to each of Y to K latent image forming devices ROSy, ROSm, ROSc, and ROSk. Photoconductor drums Py, Pm, Pc, and Pk each serving as an example of an image holding body are respectively arranged below the latent image forming devices ROSY to ROSk.

The surfaces of the rotating photoconductor drums Py, Pm, Pc, and Pk are uniformly electrically charged by charging rollers CRy, CRm, CRc, and CRk each serving as an example of a charging device. Electrostatic latent images are respectively formed on the electrically charged surfaces of the photoconductor drums Py to Pk, by laser beams Ly, Lm, Lc, and Lk serving as examples of latent image writing light output from the latent image forming devices ROSy, ROSm, ROSc, and ROSk. The electrostatic latent images on the surfaces of the photoconductor drums Py, Pm, Pc, and Pk are developed into toner images serving as examples of visible images of yellow Y, magenta M, cyan C, and black K by developing devices Gy, Gm, Gc, and Gk.

In the developing devices Gy to Gk, developers consumed by the development are supplied from toner cartridges Ky, Km, Kc, and Kk each serving as an example of a developer housing container detachably attached to a developer supply device U3b.

The toner images on the surfaces of the photoconductor drums Py, Pm, Pc, and Pk are sequentially transferred by first transfer rollers T1y, T1m, T1c, and T1k each serving as an example of a first transfer unit in a superposed manner in first transfer regions Q3y, Q3m, Q3c, and Q3k onto an intermediate transfer belt B serving as an example of an intermediate transfer body, and hence a color toner image serving as an example of a multiple-color visible image is formed on the intermediate transfer belt B. The color toner image formed on the intermediate transfer belt B is transported to a second transfer region Q4.

If only image information of K color is present, only the photoconductor drum Pk and the developing device Gk of K color are used, and only a toner image of K color is formed.

Remaining substances, such as remaining toners and paper dusts, adhering to the surfaces of the photoconductor drums Py, Pm, Pc, and Pk after the first transfer are removed by drum cleaners CLy, CLm, CLc, and CLk each serving as an example of a cleaner of the image holding body.

In the first exemplary embodiment, the photoconductor drum Pk, the charging roller CRk, and the drum cleaner CLk are integrally formed as a photoconductor unit UK of color K serving as an example of an image holding body unit. Similarly for the other colors Y, M, and C, the photoconductor drum Py, the charging roller CRy, and the drum cleaner CLy configure a photoconductor unit UY; the photoconductor drum Pm, the charging roller CRm, and the drum cleaner CLm configure a photoconductor unit UM; and the photoconductor drum Pc, the charging roller CRc, and the drum cleaner CLc configure a photoconductor unit UC.

Also, the photoconductor unit UK of K color, and the developing device Gk having a development roller R0k serving as an example of a developer holding body configure a visible image forming device UK+Gk of K color. Similarly, the photoconductor unit UY of Y color and the developing device Gy including a development roller R0y configure a visible image forming device UY+Gy of Y color; the photoconductor unit UM of M color and the developing device Gm including a development roller R0m configure a visible image forming device UM+Gm of M color; and the photoconductor unit UC of C color and the developing device Gc including a development roller R0c configure a visible image forming device UC+Gc of C color.

A belt module BM serving as an example of an intermediate transfer device is arranged below the photoconductor drums Py to Pk. The belt module BM includes the intermediate transfer belt B, a driving roller Rd serving as an example of a driving member of the intermediate transfer body, a tension roller Rt serving as an example of a tension applying member, a working roller Rw serving as an example of an anti-meandering member, plural idler rollers Rf each serving as an example of a driven member, a backup roller T2a serving as an example of an opposite member, and the first transfer rollers T1y, T1m, T1c, and T1k. The intermediate transfer belt B is supported rotationally movably in an arrow Ya direction.

A second transfer unit Ut is arranged below the backup roller T2a. The second transfer unit Ut includes a second transfer roller T2b serving as an example of a second transfer member. The second transfer region Q4 is formed in a region where the second transfer roller T2b contacts the intermediate transfer belt B. Also, the backup roller serving as an example of an opposite member faces the second transfer roller T2*b* with the intermediate transfer belt B interposed therebetween. The backup roller T2*a* contacts a contact roller T2*c* serving as an example of a power supply member. A second transfer voltage with the same polarity as the charge polarity of the toner is applied to the contact roller T2*c*.

The backup roller T2*a*, the second transfer roller T2*b*, and the contact roller T2*c* configure a second transfer unit T2.

A medium transport path SH2 is arranged below the belt module BM. The recording sheet S fed from the medium feed path SH1 of the feeder unit U2 is transported to a registration roller Rr serving as an example of a transport timing adjusting member, by a transport roller Ra serving as an example of a medium transport member. The registration roller Rr transports the recording sheet S to the downstream side to meet a timing at which the toner image formed on the intermediate transfer belt B is transported to the second transfer region Q4. The recording sheet S sent by the registration roller Rr is guided by a registration-side sheet guide SGr and a pre-transfer paper guide SG1, and transported to the second transfer region Q4.

The toner image on the intermediate transfer belt B is transferred to the recording sheet S by the second transfer unit T2 when the toner image passes through the second transfer region Q4. In case of a color toner image, toner images first transferred on the surface of the intermediate transfer belt B in a superposed manner are collectively second transferred on the recording sheet S.

The first transfer rollers T1*y* to VA, the second transfer unit T2, and the intermediate transfer belt B configure a transfer device T1*y* to T1*k*+T2+B according to the first exemplary embodiment.

The intermediate transfer belt B after the second transfer is cleaned up by a belt cleaner CLB serving as an example of an intermediate transfer body cleaner arranged downstream of the second transfer region Q4. The belt cleaner CLB eliminates remaining substances, such as remaining toners not transferred and remaining and paper dusts, from the intermediate transfer belt B in the second transfer region Q4.

The recording sheet S having the toner image transferred thereon is guided by a post-transfer paper guide SG2 and is sent to a medium transport belt BH serving as an example of a transport member. The medium transport belt BH transports the recording sheet S to a fixing device F.

The fixing device F includes a heating roller Fh serving as an example of a heating member, and a pressing roller Fp serving as an example of a pressing member. The recording sheet S is transported to a fixing region Q5 that is a region where the heating roller Fh contacts the pressing roller Fp. The toner image of the recording sheet S is heated and pressed, and hence fixed by the fixing device F when passing through the fixing region Q5.

The visible image forming devices UY+Gy to UK+Gk, the transfer device T1*y* to T1*k*+T2+B, and the fixing device F configure an image recording unit U3*a* according to the first exemplary embodiment.

A switching gate GT1 serving as an example of a switching member is provided at the downstream side of the fixing device F. The switching gate GT1 selectively switches the path of the recording sheet S, which has passed through the fixing region Q5, to one of an output path SH3 and a reverse path SH4 near the medium processing device U4. The sheet S transported to the output path SH3 is transported to a sheet transport path SH5 of the medium processing device U4. A curl correcting member U4*a* serving as an example of a warp correcting member is arranged in the sheet transport path SH5. The curl correcting member U4*a* corrects a warp, that is, a curl of the transported recording sheet S. The recording sheet S after the curl is corrected is output by an output roller Rh serving as an example of a medium output member, to an output tray TH1 serving as an example of a medium output portion, in a posture that the image fixed surface of the sheet faces upward.

The recording sheet S transported toward the reverse path SH4 side of the image creating unit U3 by the switching gate GT1 passes through a second gate GT2 serving as an example of a switching member and is transported to the reverse path SH4 of the image creating unit U3.

At this time, to output the recording sheet S in a posture that the image fixed surface faces downward, the transport direction of the recording sheet S is reversed after the rear edge in the transport direction of the recording sheet S passes through the second gate GT2. In this case, the second gate GT2 according to the first exemplary embodiment is configured of a thin film-shaped elastic member. Hence, the second gate GT2 allows the recording sheet S transported to the reverse path SH4 to pass through the second gate GT2 once. Then, when the recording sheet S after passing is reversed, that is, switched back to the second gate GT2, the second gate GT2 guides the recording sheet S toward the transport paths SH3 and SH5. Then, the switched back recording sheet S passes through the curl correcting member U4*a*, and is output to the output tray TH1 in a posture that the image fixed surface faces downward.

A circulation path SH6 is connected to the reverse path SH4 of the image creating unit U3. A third gate GT3 serving as an example of a switching member is arranged at the connection portion. Also, the downstream end of the reverse path SH4 is connected to a reverse path SH7 of the medium processing device U4.

The recording sheet S passing through the switching gate GT1 and transported to the reverse path SH4 is transported toward the reverse path SH7 of the medium processing device U4 by the third gate GT3. The third gate GT3 according to the first exemplary embodiment is configured of a thin film-shaped elastic member similarly to the second gate GT2. Hence, the third gate GT3 allows the recording sheet S transported through the reverse path SH4 to pass through the third gate GT3 once. Then, when the recording sheet S after passing is switched back to the third gate GT3, the third gate GT3 guides the recording sheet S toward the circulation path SH6.

The recording sheet S transported to the circulation path SH6 passes through the medium transport path SH2, is transmitted again to the second transfer region Q4, and printing is performed on the second surface.

Elements indicated by the reference signs SH1 to SH7 configure a sheet transport path SH. Also, elements indicated by the reference signs SH, Ra, Rr, Rh, SGr, SG1, SG2, BH, and GT1 to GT3 configure a sheet transport device SU according to the first exemplary embodiment.

Description of Body Portion U1*b* of Image Reading Device

Figure 4:
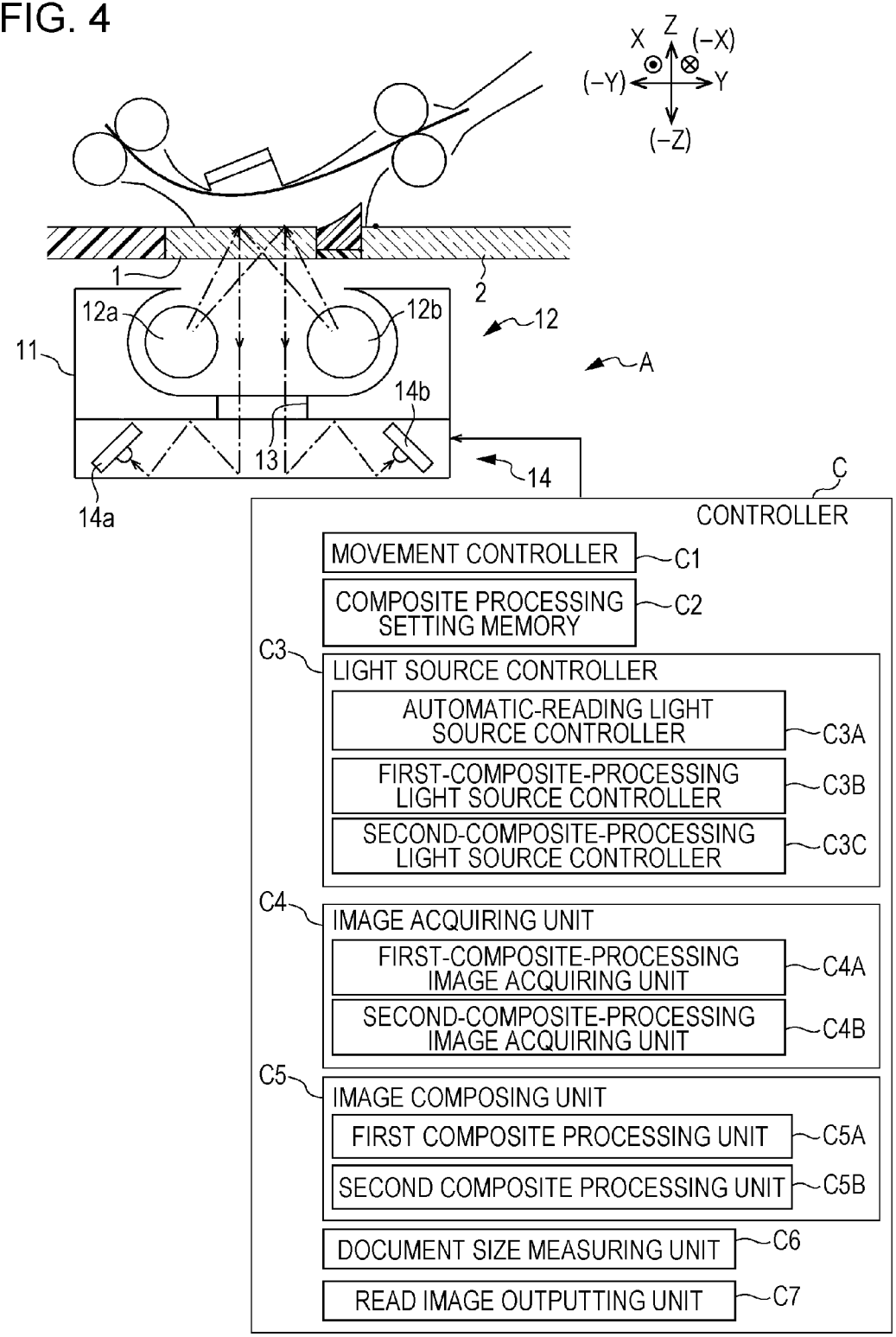
FIG. 4 is an explanatory view of a body portion of the image reading device according to the first exemplary embodiment.

FIG. 4 is an explanatory view of a body portion of the image reading device according to the first exemplary embodiment.

In FIGS. 3 and 4, the transparent document table PG is supported on the upper surface of the scanner body portion U1*b*. The transparent document table PG has an automatic reading surface 1 at the left side and a manual reading surface 2 at the right side. The automatic reading surface 1 according to the first exemplary embodiment is configured of a strip-shaped glass extending in the front-rear direction. Also, the manual reading surface 2 according to the first exemplary embodiment is configured of a plate-shaped glass with a size corresponding to the size of a document Gi with a predetermined readable maximum size.

A document guide is arranged between the automatic reading surface 1 and the manual reading surface 2. The upper surface of the document guide is configured of an inclined surface being inclined to an obliquely upper right side so as to guide the document Gi transported to the automatic reading surface 1.

The reading unit A is arranged below the document table PG. The reading unit A according to the first exemplary embodiment has a housing 11 serving as an example of a frame body. The housing 11 is supported movably among an automatic reading position located below the automatic reading surface 1, a manual reading start position corresponding to the left end of the manual reading surface 2, and a manual reading end position corresponding to the right end of the manual reading surface 2.

A lamp 12 serving as an example of a light source member is supported in an upper portion of the housing 11. The lamp 12 according to the first exemplary embodiment includes a first lamp 12a at the left side serving as an example of a first light source member, and a second lamp 12b at the right side serving as an example of a second light source member. The lamps 12a and 12b according to the first exemplary embodiment are each configured of a halogen lamp extending in the front-rear direction. However, any light source such as a light-emitting diode (LED) may be used.

Also, a pass hole 13 is formed between the first lamp 12a and the second lamp 12b. Reflected light from the document Gi passes through the pass hole 13.

A complementary metal oxide semiconductor (CMOS) sensor 14 serving as an example of a reading member is arranged below the lamp 12. The CMOS sensor 14 according to the first exemplary embodiment includes a first CMOS sensor 14a at the left side serving as an example of a first reading member, and a second CMOS sensor 14b at the right side serving as an example of a second reading member.

The first CMOS sensor 14a according to the first exemplary embodiment is arranged at a position at which the first CMOS sensor 14a may receive specular reflected light from the document Gi of light emitted from the first lamp 12a, and may receive diffuse reflected light from the document Gi of light emitted from the second lamp 12b, that is, light reflected from the document Gi in a direction different from the direction of the specular reflected light. Also, the second CMOS sensor 14b according to the first exemplary embodiment is arranged at a position at which the second CMOS sensor 14b may receive specular reflected light from the document Gi of light emitted from the second lamp 12b, and diffuse reflected light from the document Gi of light emitted from the first lamp 12a.

The first CMOS sensor 14a and the second CMOS sensor 14b according to the first exemplary embodiment are arranged at positions deviated from each other in a moving direction of the reading unit A, that is, in a sub-scanning direction. Hence, the first CMOS sensor 14a and the second CMOS sensor 14b read images at different positions in the sub-scanning direction. That is, the first CMOS sensor 14a and the second CMOS sensor 14b according to the first exemplary embodiment read images at positions deviated from each other by one line.

In the first exemplary embodiment, the CMOS sensor is used as the reading member. However, it is not limited thereto. Any reading element such as a charge coupled device (CCD) may be used.

In FIG. 3, in the document transport device U1a according to the first exemplary embodiment, a document transport path 21 is formed in the document transport unit U1a2. The document transport path 21 extends from the document feed tray U1a1 through a reading position P1 at the upper surface of the automatic reading surface 1 to the document output tray U1a3. A transport roller 22 serving as an example of a transport member is arranged in the document transport path 21. Also, an image sensor 23 serving as an example of a reading member that reads the back surface of the document Gi is arranged at the downstream side of the reading position P1 in the document transport path 21.

Description of Controller of First Exemplary Embodiment

In FIG. 4, a controller C of the copier U includes an input/output interface (I/O) that performs inputting and outputting of a signal with respect to an external portion. Also, the controller C includes a read-only memory (ROM) that stores a program for executing required processing, information, etc. Also, the controller C includes a random access memory (RAM) that temporarily stores required data. Also, the controller C includes a central processing unit (CPU) that executes processing in accordance with the program stored in the ROM etc. Hence, the controller C according to the first exemplary embodiment is configured of a small-size information processing device or so-called microcomputer. Accordingly, the controller C may realize various functions by executing the program stored in the ROM etc.

The controller C of the image creating unit U3 has a function of executing processing in accordance with an input signal from a signal output element such as the CMOS sensor 14 or a not-illustrated sensor, and outputting a control signal to each control element such as a not-illustrated motor that moves the lamp 12 or the reading unit A. That is, the controller C has functions as follows.

C1: Movement Controller

A movement controller C1 controls movement of the reading unit A of the scanner unit U1. If a document Gi is present on the document feed tray U1a1, the movement controller C1 according to the first exemplary embodiment moves the reading unit A to the automatic reading position located below the automatic reading surface 1 in an automatic reading mode. Also, if a document Gi is not present on the document feed tray U1a1, the movement controller C1 moves the reading unit A along the manual reading surface 2 from the manual reading start position to the manual reading end position, and then moves the reading unit A to the manual reading start position in a manual reading mode. In the following description, it is assumed that movement from the manual reading start position to the manual reading end position is called "forward scanning" and movement from the manual reading end position to the manual reading start position is called "backward scanning." In the first exemplary embodiment, the moving speed of the reading unit A during forward scanning and the moving speed of the reading unit A during backward scanning are set at equivalent speeds.

C2: Composite Processing Setting Memory

A composite processing setting memory C2 stores setting for composite processing of images executed based on images read by the CMOS sensors 14a and 14b. The composite processing setting memory C2 according to the first exemplary embodiment stores setting indicative of that the composite processing to be executed is either the first composite processing suitable for a document Gi of normal paper or thick paper or second composite processing suitable for a special document Gi such as embossed paper with protrusions and indentations or glossy paper with a gloss is executed. In the first exemplary embodiment, a user may set each composite processing by operating the operation unit UI.

C3: Light Source Controller

A light source controller C3 includes an automatic-reading light source controller C3A, a first-composite-processing light source controller C3B, and a second-composite-processing light source controller C3C, and controls turn-on of the lamp 12.

C3A: Automatic-Reading Light Source Controller

The automatic-reading light source controller C3A turns on both the two lamps 12a and 12b in the automatic reading mode.

C3B: First-Composite-Processing Light Source Controller

The first-composite-processing light source controller C3B turns on the first lamp 12a and the second lamp 12b during forward scanning when the first composite processing is executed. Then, the first-composite-processing light source controller C3B turns off the first lamp 12a and the second lamp 12b during backward scanning.

C3C: Second-Composite-Processing Light Source Controller

The second-composite-processing light source controller C3C turns on the first lamp 12a and turns off the second lamp 12b during forward scanning when the second composite processing is executed. Then, the second-composite-processing light source controller C3C turns on the second lamp 12b and turns off the first lamp 12a during backward scanning.

C4: Image Acquiring Unit

An image acquiring unit C4 includes a first-composite-processing image acquiring unit C4A and a second-composite-processing image acquiring unit C4B. The image acquiring unit C4 acquires images read by the CMOS sensors 14a and 14b based on output signals of the CMOS sensors 14a and 14b.

C4A: First-Composite-Processing Image Acquiring Unit

The first-composite-processing image acquiring unit C4A acquires a specular-reflected-light image read by the first CMOS sensor 14a during forward scanning, and a specular-reflected-light image read by the second CMOS sensor 14b during forward scanning in the first composite processing. The first-composite-processing image acquiring unit C4A according to the first exemplary embodiment acquires an image every two lines in the sub-scanning direction by each of the CMOS sensors 14a and 14b. In particular, the first CMOS sensor 14a reads an image in an odd-numbered line and the second CMOS sensor 14b reads an image in an even-numbered line.

C4B: Second-Composite-Processing Image Acquiring Unit

The second-composite-processing image acquiring unit C4B acquires a specular-reflected-light image read by the first CMOS sensor 14a during forward scanning, a diffused-light image read by the second CMOS sensor 14b during forward scanning, a diffused-light image read by the first CMOS sensor 14a during backward scanning, and a specular-reflected-light image read by the second CMOS sensor 14b during backward scanning in the second composite processing.

C5: Image Composing Unit

An image composing unit C5 includes a first composite processing unit C5A and a second composite processing unit C5B, and composes a read image of the document Gi based on the images read by the CMOS sensor 14.

C5A: First Composite Processing Unit

The first composite processing unit C5A composes a read image of the document Gi based on the images acquired by the first-composite-processing image acquiring unit C4A. The first composite processing unit C5A according to the first exemplary embodiment 1 combines the specular-reflected-light image in the odd-numbered line read by the first CMOS sensor 14a and the specular-reflected-light image in the even-numbered line read by the second CMOS sensor 14b and composes the read image of the document Gi. That is, the first composite processing unit C5A according to the first exemplary embodiment reads the image of the document Gi only based on the specular-reflected-light images.

C5B: Second Composite Processing Unit

The second composite processing unit C5B composes a read image of the document Gi based on the images acquired by the second-composite-processing image acquiring unit C4B. The second composite processing unit C5B according to the first exemplary embodiment acquires a specular-reflected-light image serving as an example of a first image based on the image read by the first CMOS sensor 14a during forward scanning and the image read by the second CMOS sensor 14b during backward scanning. That is, the second composite processing unit C5B creates a specular-reflected-light image by combining the specular-reflected-light image from the document Gi when the first lamp 12a is turned on and the specular-reflected-light image from the document Gi when the second lamp 12b is turned on. Then, the second composite processing unit C5B according to the first exemplary embodiment acquires a diffused-light image serving as an example of a second image based on the image read by the second CMOS sensor 14b during forward scanning and the image read by the first CMOS sensor 14a during backward scanning. That is, the second composite processing unit C5B creates a diffused-light image by combining the diffuse-reflected-light image from the document Gi when the first lamp 12a is turned on and the diffuse-reflected-light image from the document Gi when the second lamp 12b is turned on.

Figure 5A:
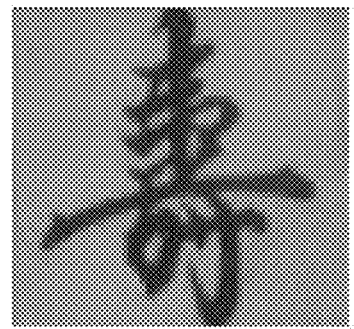
FIGS. 5A to 5C are example explanatory views of images according to the first exemplary embodiment, FIG. 5A being an explanatory view of a diffused-light image, FIG. 5B being an explanatory view of a specular-reflected-light image, FIG. 5C being an explanatory view of plural composite images with different weights.
Figure 5B:
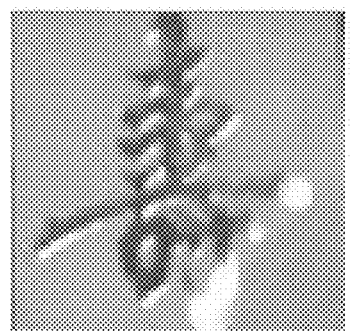
Figure 5C:
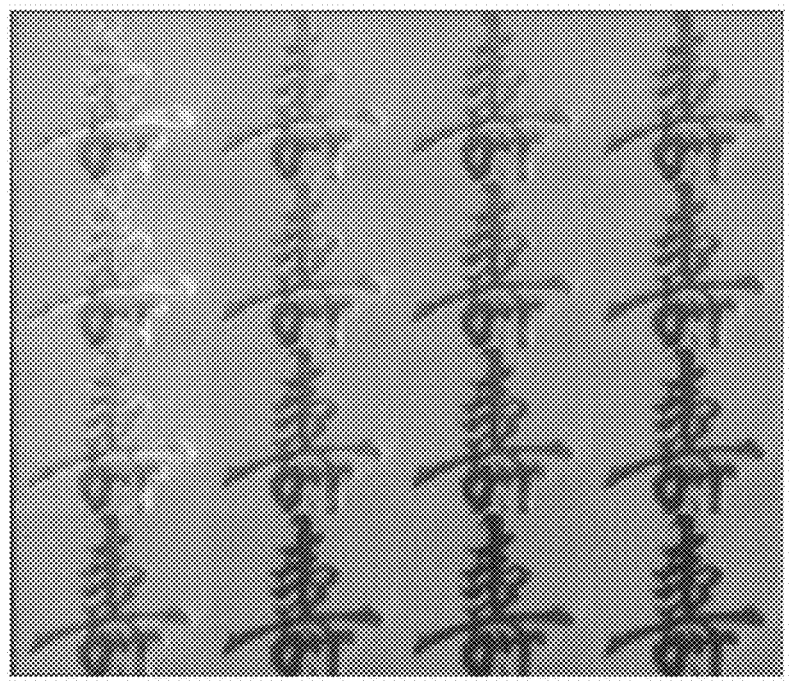

FIGS. 5A to 5C are example explanatory views of images according to the first exemplary embodiment, FIG. 5A being an explanatory view of a diffused-light image, FIG. 5B being an explanatory view of a specular-reflected-light image, FIG. 5C being an explanatory view of plural composite images with different weights.

Then, the second composite processing unit C5B according to the first exemplary embodiment composes a read image of the document Gi based on the specular-reflected-light image and the diffused-light image. Referring to FIGS. 5A to 5C, for example, the second composite processing unit C5B according to the first exemplary embodiment combines a specular-reflected-light image shown in FIG. 5B and a diffused-light image shown in FIG. 5A based on predetermined weights as shown in FIG. 5C. In FIG. 5C, an upper left section is a composite image with a weight of 100:0 between the specular-reflected-light image and the diffused-light image, a lower right section is a composite image with a weight of 0:100, and an image in an intermediate section is a composite image having a larger weight of the specular-reflected-light image toward the upper and left side. In the first exemplary embodiment, the weight is set at, for example, 50:50. Alternatively, the weight may be manually set by a user.

C6: Document Size Measuring Unit

A document size measuring unit C6 serving as an example of a size measuring unit measures the size of the document Gi placed on the manual reading surface 2 based on the image read by the CMOS sensor 14 during forward scanning and the image read by the CMOS sensor 14 during backward scanning. The document size measuring unit C6 according to the first exemplary embodiment specifies a shadow of an edge at the reading start position side of the document Gi and a shadow of an edge near the reading end position based on the image read by the second CMOS sensor 14b during forward scanning and the image read by the first CMOS sensor 14a during backward scanning, and measures the size of the document Gi from the size of the document Gi after the shadows are eliminated. For example, the shadows of an image may be specified by acquiring a difference between an image read by the second CMOS sensor 14b during forward scanning and an image read by the first CMOS sensor 14a during backward scanning.

C7: Read Image Outputting Unit

The read image outputting unit C7 outputs the image of the document Gi read by the reading unit A to the image processing unit. The read image outputting unit C7 according to the first exemplary embodiment combines the specular-reflected-light images respectively read by the CMOS sensors 14a and 14b and outputs the combined image in the automatic reading mode. Also, the read image outputting unit C7 outputs the image composed by the image composing unit C5 in the manual reading mode.

Operation of Reading Processing of Document Image

In the copier U according to the first exemplary embodiment having the above-described configuration, when an input of a copy start key is made, if a document Gi is not present on the document feed tray U1a1, the "manual reading mode" is executed. Also, if a document Gi is present on the document feed tray U1a1, the "automatic reading mode" is executed.

When the manual reading mode is executed, if the first composite processing is set, both the lamps 12a and 12b are turned on during forward scanning of the reading unit A. Hence, similarly to a scanner of related art, an image is read based on specular-reflected-light images read by the CMOS sensors 14a and 14b.

Also, when the manual reading mode is executed, if the second composite processing is set, the first lamp 12a is turned on during forward scanning of the reading unit A, and the second lamp 12b is turned on during backward scanning.

Figure 6A:
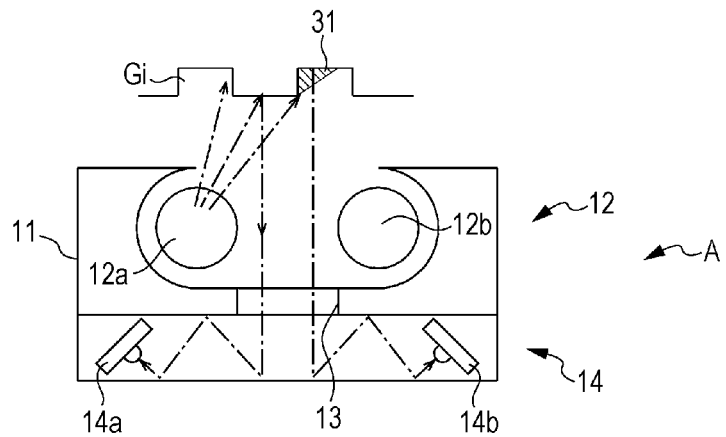
Figure 6B:
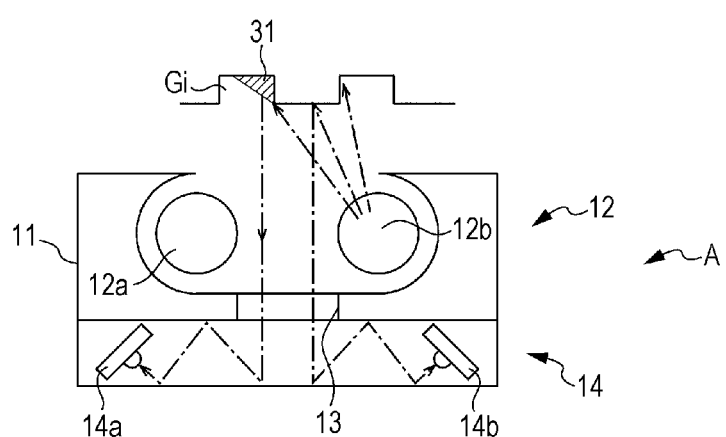
Figure 6C:
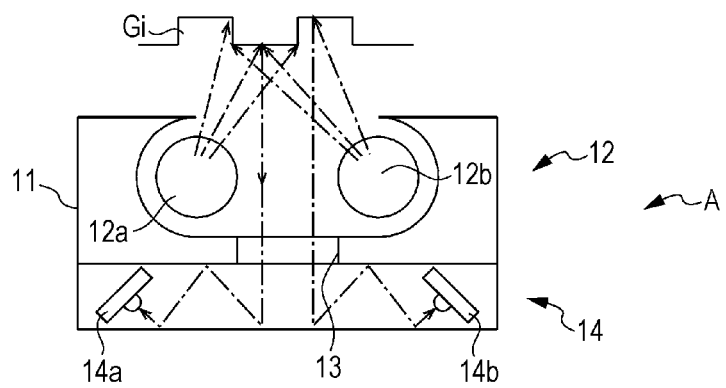

FIGS. 6A to 6C are explanatory views each indicating a relationship between a document with protrusions and indentations and irradiation light from lamps according to the first exemplary embodiment, FIG. 6A being an explanatory view of a state in which only the first lamp is turned on, FIG. 6B being an explanatory view of a state in which only the second lamp is turned on, FIG. 6C being an explanatory view of a state in which both the two lamps are turned on.

As shown in FIGS. 6A and 6B, when light is emitted from one of the lamps during the second composite processing, a shadow 31 is generated in an image to be read if a document has protrusions and indentations, for example, if the document is embossed paper with protrusions and indentations, if protrusions and indentations are present on the surface because the thicknesses of layered paints are different such as an oil paint, if the document is a document printed on a cloth, or if the document is a document with characters with protrusion and indentation. Hence, the read image includes the shadow 31.

Since the first CMOS sensor 14a and the second CMOS sensor 14b have the different reading positions in the moving direction of the reading unit A, that is, in the sub-scanning direction, when one of the lamps 12a and 12b is turned on, the first CMOS sensor 14a and the second CMOS sensor 14b read a specular-reflected-light image with a large reflected light quantity and a diffused-light image with a small reflected light quantity.

In contrast, referring to FIG. 6C, with a technology of related art, two lamps at the upstream side and the downstream side are turned on and emit light from both sides of the reading position. Alternatively, there is known a configuration in which a single lamp is arranged at the downstream side and a reflecting mirror is arranged at the upstream side so that light is emitted from both sides. In this case, an image with almost no shadow is acquired. However, an image without a shadow has poor three-dimensionality, and when an image of a document with projections and indentations is copied, a copied image becomes different from the image of the document Gi with three-dimensionality. That is, a reading defect occurs.

Also, in case of a document with gold characters printed thereon or a document with a gloss such as a document with a print on glossy paper, the reflected light quantity of the specular-reflected-light image is increased, and if a portion with an excessive reflected light quantity is generated, the image of this portion becomes white. Hence, as shown in FIG. 5B, a reading defect called an irregular unprinted spot may be generated in a portion of the read image.

Owing to this, in the first exemplary embodiment, one of the lamps 12a and 12b is turned on during forward scanning and the other one of the lamps 12a and 12b is turned on during backward scanning in the manual reading mode. Accordingly, the read image contains a shadow. Then, the image acquired by combining the specular-reflected-light image with a relatively small influence of the shadow and the diffused-light image with a relatively large influence of the shadow is output. Thus, as compared with a case in which both the lamps are turned on, the read image may have three-dimensionality.

Also, in the first exemplary embodiment, even in the case of a document with a gloss, the composite image acquired by combining the specular-reflected-light image with a large reflected light quantity and the diffuse-reflected-light image with a small reflected light quantity is output. Accordingly, an irregular unprinted spot is reduced as compared with the configuration of related art in which both the lamps are turned on. Therefore, in the first exemplary embodiment, a reading defect is reduced as compared with the configuration of related art.

In particular, in the first exemplary embodiment, the specular-reflected-light image is acquired by combining the specular-reflected-light images by forward scanning and backward scanning, and the diffused-light image is acquired similarly. For example, if only the specular-reflected-light image by forward scanning is used when the specular-reflected-light image is acquired, the influence of the shadow 31 may be increased at the downstream side of the read image. That is, the shadow may be unevenly arranged. In contrast, in the first exemplary embodiment, the specular-reflected-light images by forward scanning and backward scanning are combined, and hence the unevenness of the shadow is reduced.

Also, in the first exemplary embodiment, one of the lamps 12a and 12b is turned on during forward scanning and the other one of the lamps 12a and 12b is turned on during backward scanning. Accordingly, as compared with a case in which first forward scanning is performed while one of lamps is turned on and second forward scanning is performed while the other one of the lamps is turned on, the time required for reading is reduced.

Figure 7A:
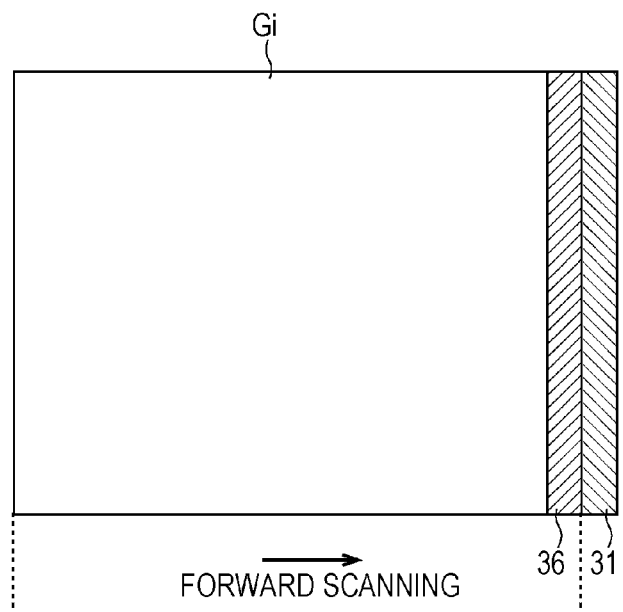
FIGS. 7A and 7B are explanatory views when a document with an image at an end portion of a sheet is read by a reading unit according to the first exemplary embodiment, FIG. 7A being an explanatory view of forward scanning, FIG. 7B being an explanatory view of backward scanning.
Figure 7B:
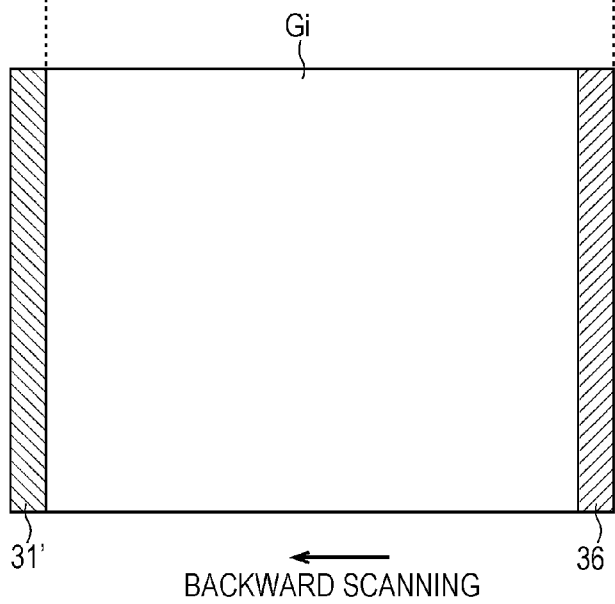

FIGS. 7A and 7B are explanatory views when a document with an image at an end portion of a sheet is read by the reading unit according to the first exemplary embodiment, FIG. 7A being an explanatory view of forward scanning, FIG. 7B being an explanatory view of backward scanning.

In FIGS. 7A and 7B, in a case in which an image 36 is formed in an end portion of a document Gi, if a shadow 31 to be measured during forward scanning is present, the image 36 may be erroneously recognized as the shadow 31, and the end portion of the document Gi may not be correctly measured. In contrast, in the first exemplary embodiment, by acquiring a difference between a diffused-light image during forward scanning and a diffused-light image during backward scanning, shadows 31 and 31' are specified. Accordingly, the size of the document Gi is measured on the basis of the size of the document Gi after the shadows 31 and 31' are eliminated from the read image of the document Gi. Therefore, even if the document Gi has the image 36 at the end portion, the size of the document Gi is correctly measured. Also, a sensor for size detection of the document Gi is not required to be additionally provided, and the number of sensors may be reduced.

In particular, in the first exemplary embodiment, not only one of the ends of the document Gi, but also both ends may be accurately measured. Accordingly, even in a case of an irregular-size document, or in other words, a free-size document Gi, the size of the document Gi may be accurately measured.

Second Exemplary Embodiment

A second exemplary embodiment of the invention is described below. In the description of this second exemplary embodiment, the same reference sign is applied to a component corresponding to the component of the first exemplary embodiment, and the detailed description of the component is omitted.

The second exemplary embodiment differs from the first exemplary embodiment in the following point; however, is configured similarly to the first exemplary embodiment in the other points.

Figure 8:
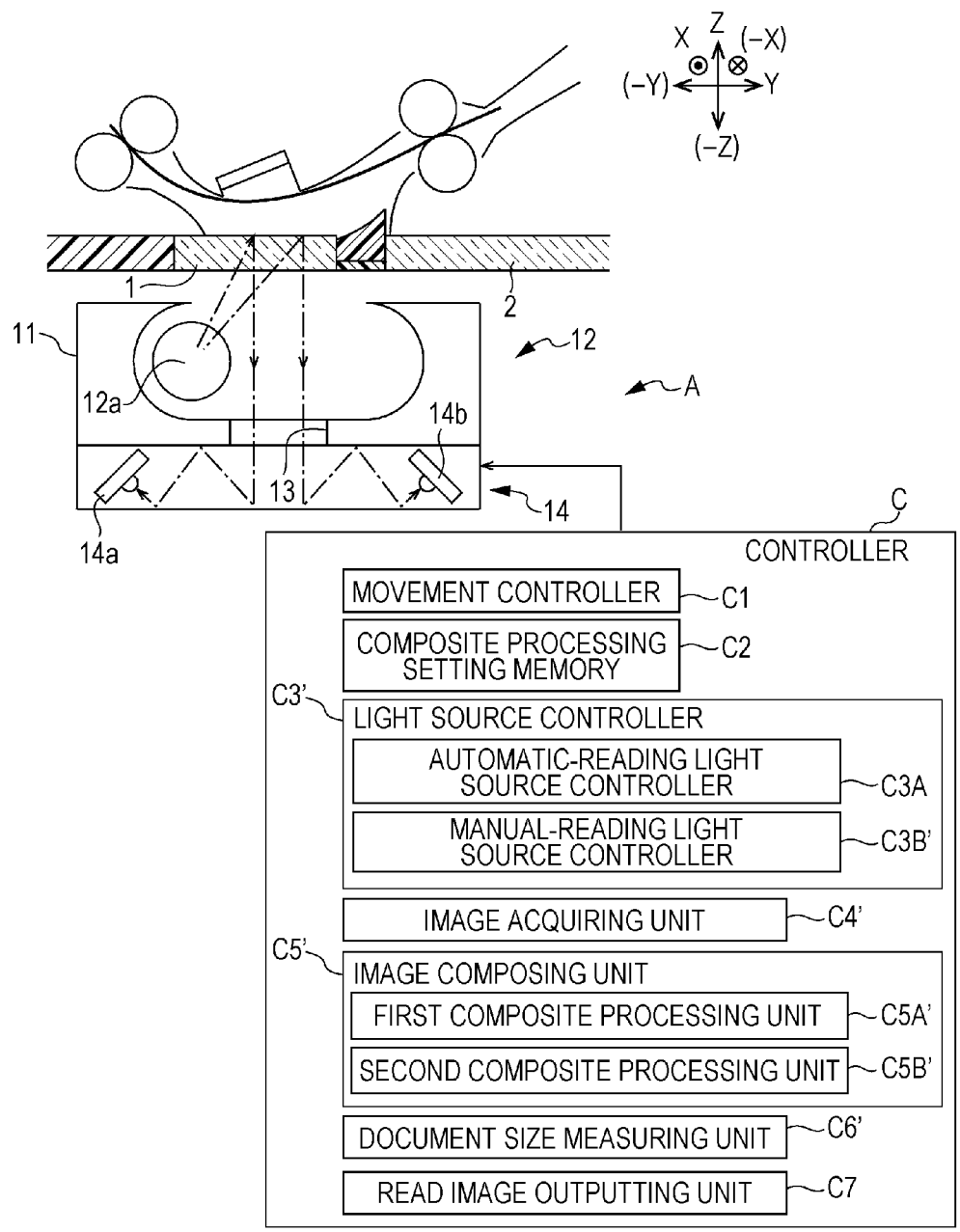
FIG. 8 is an explanatory view of a body portion of an image reading device according to a second exemplary embodiment, FIG. 8 being an illustration corresponding to FIG. 4 according to the first exemplary embodiment.

FIG. 8 is an explanatory view of a body portion of an image reading device according to the second exemplary embodiment, FIG. 8 being an illustration corresponding to FIG. 4 according to the first exemplary embodiment.

In FIG. 8, the reading unit A according to the second exemplary embodiment does not include the second lamp 12b and includes only the first lamp 12a unlike the first exemplary embodiment.

In the second exemplary embodiment, the CMOS sensors 14a and 14b read images every single line along the sub-scanning direction in the second composite processing unlike the first exemplary embodiment.

As compared with the controller C of the first exemplary embodiment, the controller C according to the second exemplary embodiment includes a light source controller C3', an image acquiring unit C4', an image composing unit C5', and a document size measuring unit C6' instead of the respective units C3 to C6 of the first exemplary embodiment.

C3': Light Source Controller

The light source controller C3' includes the automatic-reading light source controller C3A similar to that of the first exemplary embodiment, and a manual-reading light source controller C3B', and controls turn-on and turn-off of the lamp 12.

C3B': Manual-Reading Light Source Controller

The manual-reading light source controller C3B' turns on the first lamp 12a during forward scanning for manual reading. The first lamp 12a is turned off during backward scanning.

C4': Image Acquiring Unit

The image acquiring unit C4' acquires a specular-reflected-light image read by the first CMOS sensor 14a during forward scanning, and a diffused-light image read by the second CMOS sensor 14b during forward scanning.

C5': Image Composing Unit

The image composing unit C5' according to the second exemplary embodiment includes a first composite processing unit C5A' and a second composite processing unit C5B', and composes a read image of the document Gi based on the images read by the CMOS sensor 14.

C5A': First Composite Processing Unit

The first composite processing unit C5A' composes a read image of the document Gi based on the images acquired by the first-composite-processing image acquiring unit C4'. The first composite processing unit C5A' according to the second exemplary embodiment composes the read image of the document Gi based on the specular-reflected-light image in each line read by the first CMOS sensor 14a. That is, the first composite processing unit C5A' according to the second exemplary embodiment reads the image of the document Gi only based on the specular-reflected-light image.

C5B': Second Composite Processing Unit

The second composite processing unit C5B' composes a read image of the document Gi based on the images acquired by the image acquiring unit C4'. The second composite processing unit C5B' according to the second exemplary embodiment combines the specular-reflected-light image read by the first CMOS sensor 14a during forward scanning and the diffused-light image read by the second CMOS sensor 14b during forward scanning, similarly to the second composite processing unit C5B according to the first exemplary embodiment.

C6': Document Size Measuring Unit

The document size measuring unit C6' according to the second exemplary embodiment measures the size of the document Gi based on the diffused-light image read by the second CMOS sensor 14b during forward scanning. In the second exemplary embodiment, a shadow of an end near the reading start position of the document Gi and a shadow of an end near the reading end position are specified from the diffused-light image read by the second CMOS sensor 14b and the specular-reflected-light image read by the first CMOS sensor 14a, and the size of the document Gi is measured from the size of the document Gi after the shadow is eliminated.

Operation of Second Exemplary Embodiment

In the copier U according to the second exemplary embodiment having the above-described configuration, the specular reflected light and the diffuse reflected light of the light emitted from the single lamp 12a are received by the two CMOS sensors 14a and 14b. If the second composite processing is set similarly to the first exemplary embodiment, the specular-reflected-light image and the diffused-light image are combined and the read image is formed. Accordingly, as compared with the configuration of related art in which image information is created only from a specular-reflected-light image in a single direction, with the second exemplary embodiment, a reading defect of a document with protrusions and indentations or a document with a gloss is reduced.

Also, in the second exemplary embodiment, the size of the document Gi is measured on the basis of the diffused-light image similarly to the first exemplary embodiment. Accordingly, as compared with a case in which a sensor for detecting the size of the document Gi is additionally provided, the number of sensors may be reduced.

Third Exemplary Embodiment

A third exemplary embodiment of the invention is described below. In the description of this third exemplary embodiment, the same reference sign is applied to a component corresponding to the component of the first exemplary embodiment, and the detailed description of the component is omitted.

The third exemplary embodiment differs from the first exemplary embodiment in the following point; however, is configured similarly to the first exemplary embodiment in the other points.

Figure 9:
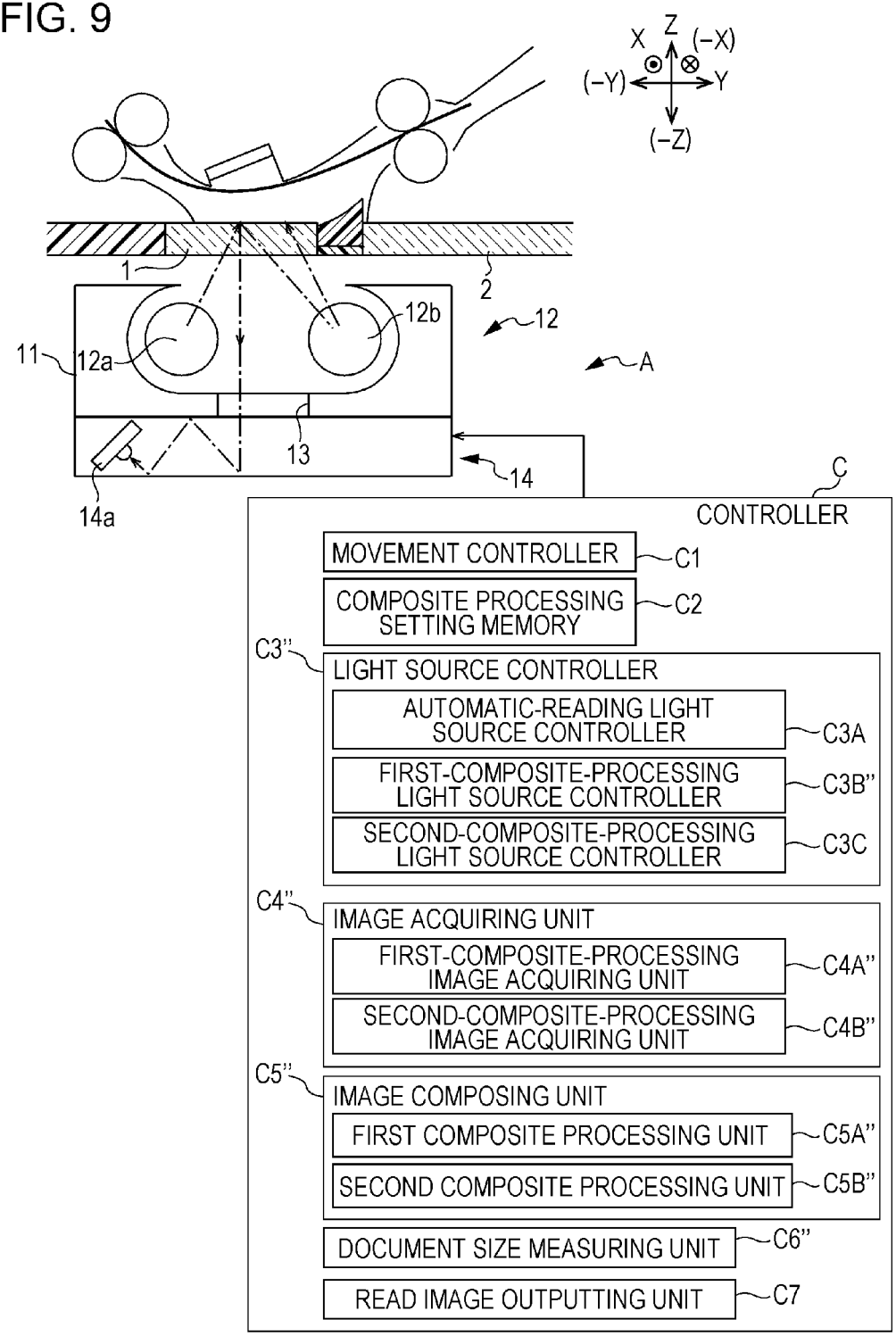
FIG. 9 is an explanatory view of a body portion of an image reading device according to a third exemplary embodiment, FIG. 9 being an illustration corresponding to FIG. 4 according to the first exemplary embodiment.

FIG. 9 is an explanatory view of a body portion of an image reading device according to a third exemplary embodiment, FIG. 9 being an illustration corresponding to FIG. 4 according to the first exemplary embodiment.

In FIG. 9, the reading unit A according to the third exemplary embodiment does not include the second CMOS sensor 14b and includes only the first CMOS sensor 14a unlike the first exemplary embodiment.

In the third exemplary embodiment, the first CMOS sensor 14a reads an image every single line along the sub-scanning direction unlike the first exemplary embodiment.

Also, as compared with the controller C of the first exemplary embodiment, the controller C according to the third exemplary embodiment includes a light source controller C3", an image acquiring unit C4", an image composing unit C5", and a document size measuring unit C6" instead of the respective units C3 to C6 of the first exemplary embodiment.

C3": Light Source Controller

The light source controller C3" includes the automatic-reading light source controller C3A and the second-composite-processing light source controller C3C similar to the first exemplary embodiment, and also includes a first-composite-processing light source controller C3B" different from the first exemplary embodiment.

C3B": First-Composite-Processing Light Source Controller

The first-composite-processing light source controller C3B" turns on the first lamp 12a and turns off the second lamp 12b during forward scanning when the first composite processing is executed. Then, the first-composite-processing light source controller C3B" turns off the first lamp 12a and the second lamp 12b during backward scanning.

C4": Image Acquiring Unit

The image acquiring unit C4" according to the third exemplary embodiment includes a first-composite-processing image acquiring unit C4A" and a second-composite-processing image acquiring unit C4B" in the first composite processing different from the first exemplary embodiment.

C4A": First-Composite-Processing Image Acquiring Unit

The first-composite-processing image acquiring unit C4A" according to the third exemplary embodiment acquires a specular-reflected-light image read by the first CMOS sensor 14a during forward scanning in the first composite processing.

C4B": Second-Composite-Processing Image Acquiring Unit

The second-composite-processing image acquiring unit C4B" according to the third exemplary embodiment acquires a specular-reflected-light image read by the first CMOS sensor 14a during forward scanning, and a diffused-light image read by the first CMOS sensor 14a during backward scanning in the second composite processing.

C5": Image Composing Unit

The image composing unit C5" includes a first composite processing unit C5A" and a second composite processing unit C5B", and composes a read image of the document Gi based on the images read by the CMOS sensor 14.

C5A": First Composite Processing Unit

The first composite processing unit C5A" according to the third exemplary embodiment composes a read image of the document Gi based on the specular-reflected-light image acquired every single line by the first-composite-processing image acquiring unit C4A" in the first composite processing.

C5B": Second Composite Processing Unit

The second composite processing unit C5B" according to the third exemplary embodiment composes a read image of the document Gi based on the image acquired by the second-composite-processing image acquiring unit C4B" in the second composite processing. The second composite processing unit C5B" according to the third exemplary embodiment composes a read image of the document Gi based on the specular-reflected-light image read by the first CMOS sensor 14a during forward scanning and the diffused-light image read by the first CMOS sensor 14a during backward scanning, similarly to the first exemplary embodiment.

C6": Document Size Measuring Unit

The document size measuring unit C6" according to the third exemplary embodiment measures the size of the document Gi based on the specular-reflected-light image read by the first CMOS sensor 14a during forward scanning and the diffused-light image read by the first CMOS sensor 14a during backward scanning. That is, the document size measuring unit C6" measures the size of the document Gi based on reflected light of light emitted on the document Gi in different directions.

Operation of Third Exemplary Embodiment

In the copier U according to the third exemplary embodiment having the above-described configuration, the specular reflected light and the diffuse reflected light of the light emitted from the two lamps 12a and 12b are received by the single CMOS sensor 14a. If the second composite processing is set, the specular-reflected-light image and the diffused-light image are combined and the read image is formed, similarly to the first exemplary embodiment. Accordingly, as compared with the configuration of related art in which image information is created only from a specular-reflected-light image in a single direction, with the third exemplary embodiment, a reading defect of a document with protrusions and indentations or a document with a gloss is reduced.

Also, in the third exemplary embodiment, the size of the document Gi is measured on the basis of the diffused-light image similarly to the first exemplary embodiment. Accordingly, as compared with a case in which a sensor for detecting the size of the document Gi is additionally provided, the number of sensors may be reduced.

Modifications

The exemplary embodiments of the present invention have been described above; however, the present invention is not limited to the exemplary embodiments, and may be modified within the scope of the present invention described in the claims. Modifications (H01) to (H010) of the invention are exemplarily described below.

(H01) In the above-described exemplary embodiments, the copier U is employed as an example of the image forming apparatus. However, it is not limited thereto. The image forming apparatus may be applied to a facsimile, a multi-function apparatus having plural functions such as a facsimile, etc. Also, the image forming apparatus is not limited to the electrophotographic image forming apparatus, and may be applied to an image forming apparatus of any image formation system, such as inkjet recording system or thermal head system, for example, a printer, of lithography. Also, the image forming apparatus is not limited to the image forming apparatus of multi-color development, and may be applied to a monochrome image forming apparatus. Also, the image forming apparatus is not limited to the tandem image forming apparatus, and may be applied to a rotary image forming apparatus.

(H02) In the above-described exemplary embodiments, the scanner unit U1 is employed as an example of the image reading device provided in the copier U as an example of the image forming apparatus. However, it is not limited thereto. For example, an independent scanner unit U1 may be employed.

(H03) In the above-described exemplary embodiments, the reading unit A having the lamp 12 and the CMOS sensor 14 is moved. However, it is not limited thereto. For example, the lamp 12 and an optical system such as a reflecting mirror may be moved, and a reading member may not be moved.

(H04) In the above-described exemplary embodiments, the two CMOS sensors 14 are provided. However, it is not limited thereto. Three or more CMOS sensors may be provided.

(H05) In the third exemplary embodiment, the first lamp 12a is turned on during forward scanning and the second lamp 12b is turned on during backward scanning; however, it is not limited thereto. For example, the first lamp 12a may be turned on during first forward scanning, both the lamps 12a and 12b may be turned off during backward scanning, and the second lamp 12b may be turned on during second forward scanning. That is, two-time scanning may be performed while the lamp to be turned on is changed between the lamps 12a and 12b. In particular, in the first to third exemplary embodiments, a configuration may be modified to acquire specular reflected light and diffuse reflected light by performing plural-time scanning (including backward scanning) by switching the CMOS sensor between the two CMOS sensors and by switching turn-on and turn-off of the lamps.

(H06) In the above-described exemplary embodiments, the configuration that measures the document size is desirably employed; however, the configuration may be omitted.

(H07) In the above-described exemplary embodiments, the exemplified specific numerical values may be desirably changed in accordance with the design and specifications.

(H08) In the second exemplary embodiment, the first lamp 12a may be turned on even during backward scanning to acquire an image.

(H09) In the first exemplary embodiment, an image is read every two lines; however, it is not limited thereto. An image may be read per line, or an image may be read every three or more lines in accordance with the setting of resolution or the like.

(H010) In the exemplary embodiments, one of the first composite processing and the second composite processing is selectively executed; however, it is not limited thereto. Only the second composite processing may be executed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading device, comprising:
   a support table that supports a document;
   a light source that is supported movably along the support table between a reading start position set near one end of the support table and a reading end position set near the other end of the support table and that irradiates the document with light, the light source including a first light source that irradiates the document with light in a first direction and a second light source that irradiates the document with light in a second direction different from the first direction, the light source being configured to:
   (i) move along the support table from the reading start position to the reading end position in a first scan period, and only one of the first light source and the second light source is turned on for the duration of the first scan period, and
   (ii) move back from the reading end position to the reading start position in a second scan period, and only the other one of the first light source and the second light source is turned on for the duration of the second scan period;
   a reading member that reads an image based on reflected light from the document, the reading member including:
   a first reading member that (i) reads light originating from the first direction and reflected from the document and (ii) is positioned to receive specular reflected light with a large reflected light quantity from the first light source and diffuse reflected light with a small reflected light quantity from the second light source; and
   a second reading member that (i) reads light originating from the second direction and reflected from the document and (ii) is positioned to receive specular reflected light with a large reflected light quantity from the second light source and diffuse reflected light with a small reflected light quantity from the first light source; and
   an image composing unit that composes read image information based on a first image read by the reading member based on light originated from the first direction and reflected from the document and a second image based on light originated from the second direction and reflected from the document.

2. The image reading device according to claim 1,
   wherein the image composing unit further combines an image read by the first reading member and an image read by the second reading member when the light source is moved from the reading start position to the reading end position.

3. The image reading device according to claim 1,
wherein the light source is further configured to move along the support table from the reading start position to the reading end position in a third scan period, and both the first light source and the second light source are turned on for the duration of the third scan period,
wherein the image composing unit executes one of first composite processing and second composite processing,
wherein the first composite processing combines an image read by the first reading member and an image read by the second reading member and deviated from a position of the image read by the first reading member in a moving direction of the light source, and
wherein the second composite processing combines images including
- an image read by the first reading member and an image red by the second reading member and deviated from a position of the image read by the first reading member in the moving direction of the light source when the first light source is turned on and the second light source is turned off during the first scan period,
- an image read by the first reading member and an image read by the second reading member and deviated from a position of the image read by the first reading member in the moving direction of the light source when the first light source is turned on and the second light source is turned off during the second scan period,
- an image read by the first reading member and an image read by the second reading member and deviated from a position of the image read by the first reading member in the moving direction of the light source when the first light source is turned off and the second light source is turned on during the first scan period, and
- an image read by the first reading member and an image read by the second reading member and deviated from a position of the image read by the first reading member in the moving direction of the light source when the first light source is turned off and the second light source is turned on during the second scan period.

4. The image reading device according to claim 1,
Wherein an image of the document is read from an image read by the first reading member and a size of the document is detected from an image read by the second reading member when the light source is moved from the reading start position to the reading end position.

5. The image reading device according to claim 1,
Wherein an image of the document is read from an image read by the reading member during the first scan period, and
Wherein a size of the document is detected from an image read by the reading member during the second scan period.

6. An image forming apparatus, comprising:
the image reading device that reads a document according to claim 1; and
an image recording device that records a read image read by the image reading device on a medium.

\* \* \* \* \*